(12) United States Patent
Eschbach et al.

(10) Patent No.: US 9,736,330 B2
(45) Date of Patent: Aug. 15, 2017

(54) METHOD AND SYSTEM FOR APPLYING A CONTENT-VARIABLE WATERMARK TO A DOCUMENT

(71) Applicant: Xerox Corporation, Norwalk, CT (US)

(72) Inventors: Reiner Eschbach, Webster, NY (US); Phillip J. Emmett, Rochester, NY (US); Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/715,866

(22) Filed: May 19, 2015

(65) Prior Publication Data

US 2016/0344891 A1 Nov. 24, 2016

(51) Int. Cl.
*H04N 1/32* (2006.01)
*G06K 15/02* (2006.01)

(52) U.S. Cl.
CPC ......... *H04N 1/32352* (2013.01); *G06K 15/02* (2013.01); *H04N 1/32325* (2013.01)

(58) Field of Classification Search
CPC combination set(s) only.
See application file for complete search history.

(56) References Cited

U.S. PATENT DOCUMENTS

| 5,734,752 | A | 3/1998 | Knox |
| 6,243,504 | B1 | 6/2001 | Kruppa |
| 2003/0211299 | A1 | 11/2003 | Rajan et al. |
| 2004/0170912 | A1 | 9/2004 | Brennan |
| 2006/0230273 | A1 | 10/2006 | Crichton |
| 2007/0017990 | A1 | 1/2007 | Katsurabayashi |
| 2007/0217847 | A1* | 9/2007 | Naota ............... H04N 1/00326 400/62 |
| 2007/0256136 | A1 | 11/2007 | Simske et al. |
| 2007/0268341 | A1 | 11/2007 | Morgan et al. |
| 2008/0080009 | A1* | 4/2008 | Masui ................. G06T 1/0028 358/3.28 |
| 2008/0299333 | A1 | 12/2008 | Bala et al. |
| 2008/0302263 | A1 | 12/2008 | Eschbach et al. |
| 2008/0304696 | A1 | 12/2008 | Eschbach et al. |
| 2008/0305444 | A1 | 12/2008 | Eschbach et al. |
| 2011/0052888 | A1 | 3/2011 | Eschbach et al. |

(Continued)

FOREIGN PATENT DOCUMENTS

| JP | 2006039478 A | 2/2006 |
| JP | 2009000832 A | 1/2009 |

*Primary Examiner* — Christopher D Wait
(74) *Attorney, Agent, or Firm* — Fox Rothschild LLP

(57) ABSTRACT

A system creates a copy of a document by: receiving an electronic representation a document to be copied onto a substrate; identifying a non-invasive watermark to be printed on the substrate; analyzing the document and the non-invasive watermark to determine whether a threshold amount of the non-invasive watermark can be printed in a white space of the document; and creating a secure copy of the document with the watermark. If the threshold amount of the non-invasive watermark can be printed in the white space, the system will print at least a portion the non-invasive watermark in the white space. Otherwise, the system will modify at least a portion of the non-invasive watermark to comprise an invasive watermark portion, and it will print the invasive watermark portion over a portion of the document's content.

18 Claims, 9 Drawing Sheets

(56) References Cited

U.S. PATENT DOCUMENTS

2011/0307592 A1 12/2011 de la Huerga
2012/0093412 A1 4/2012 Dauw et al.
2012/0113443 A1 5/2012 Itoh et al.

* cited by examiner

FIG. 3

METHOD AND SYSTEM FOR APPLYING A CONTENT-VARIABLE WATERMARK TO A DOCUMENT

BACKGROUND

Security is an important requirement in many document printing applications. In situations such as official or government document printing, event ticket printing, financial instrument printing and the like, many printed documents must be protected against copying, forging and/or counterfeiting.

A potential consequence of creating unsecure documents is the undesired dissemination of confidential information. Security leaks happen at many different levels and in many different forms. The most well-known and publicized is the intentional "stealing" of information in paper or digital form. However, there are other forms of leakage that may be even more prevalent, such as the unintentional leaving of a proprietary document in a meeting room, the negligent hand-off of a document to an unauthorized person, or personnel's general lack of awareness of the proprietary nature of a document.

A watermark is a type of security element that can be applied to various documents. Watermarks can help provide for the authentication or tracking of documents. However, a particular watermark may not work for all types of documents, especially those having content that may partially or fully obscure the watermark.

This document describes methods and systems for creating and using a document with a security mark that addresses at least some of the problems described above, and/or other problems.

SUMMARY

In an embodiment, a system that includes a print device and processor creates a secure copy of a document by: receiving an electronic representation of a document to be printed onto a substrate; identifying a non-invasive watermark to be printed on the substrate; and analyzing the document and the non-invasive watermark to determine whether a first threshold amount of the non-invasive watermark can be printed in a white space of the document. When the system determines that the amount of the non-invasive watermark that can be printed in the white space is less than the first threshold, it will modify at least a portion of the non-invasive watermark to comprise an invasive watermark portion. The system will then create a secure copy of the document by causing the print device to print document content for the document on the substrate, and when doing so print the invasive watermark portion so that the invasive watermark portion covers a portion of the document content that is outside of the white space of the document. Optionally, the system also may print an unmodified portion of the non-invasive watermark in the white space of the document.

Optionally, the system may determine that at least a second threshold amount of the non-invasive watermark cannot be printed in the white space of the document. If so, it may modify the non-invasive watermark so that the non-invasive watermark is fully converted into an invasive watermark.

In some embodiments, when modifying at least a portion of the non-invasive watermark to comprise an invasive watermark portion, the system may convert a color of the modified portion of the non-invasive portion to a color that will significantly contrast with the portion of the document that the non-invasive portion will cover.

Optionally, when analyzing the document and the non-invasive watermark to determine whether at least a first threshold amount of the non-invasive watermark can be printed in a white space of the document, the system may: (i) determine a portion of the document that will correspond to a background area that will have no printed document content; (ii) calculate a percentage of the document that will comprise the background area; and (iii) determine whether the percentage at least exceeds the threshold.

Optionally, when analyzing the document and the non-invasive watermark to determine whether at least a first threshold amount of the non-invasive watermark can be printed in a white space of the document, the system may: (i) determine a portion of the document that corresponds to a boundary area of the non-invasive watermark; (ii) identify a background area within the boundary area that will have no printed document content; (iii) calculate a percentage of the document within the boundary area that will comprise the background area; and (iv) determine whether the percentage at least exceeds the threshold.

Optionally, when analyzing the document and the non-invasive watermark to determine whether at least a first threshold amount of the non-invasive watermark can be printed in a white space of the document, the system may: (i) determine a portion of the document that corresponds to a boundary area of the non-invasive watermark; and (ii) determine whether one or more non-white space areas of the document will divide the boundary area into at least a threshold number of sub-areas.

As another option, the system may receive, via a user interface, a user command to customize an element of the non-invasive watermark. If so, then in response to the user command, the system may apply a modification to the element of the non-invasive watermark so that the modification will be visible even if any portion of the element is converted to an invasive watermark.

BRIEF DESCRIPTION OF THE DRAWINGS

FIG. 3 illustrates an example of the text-based document of FIG. 1 with the non-invasive watermark of FIG. 2 applied to it.

DETAILED DESCRIPTION

Figure 1:
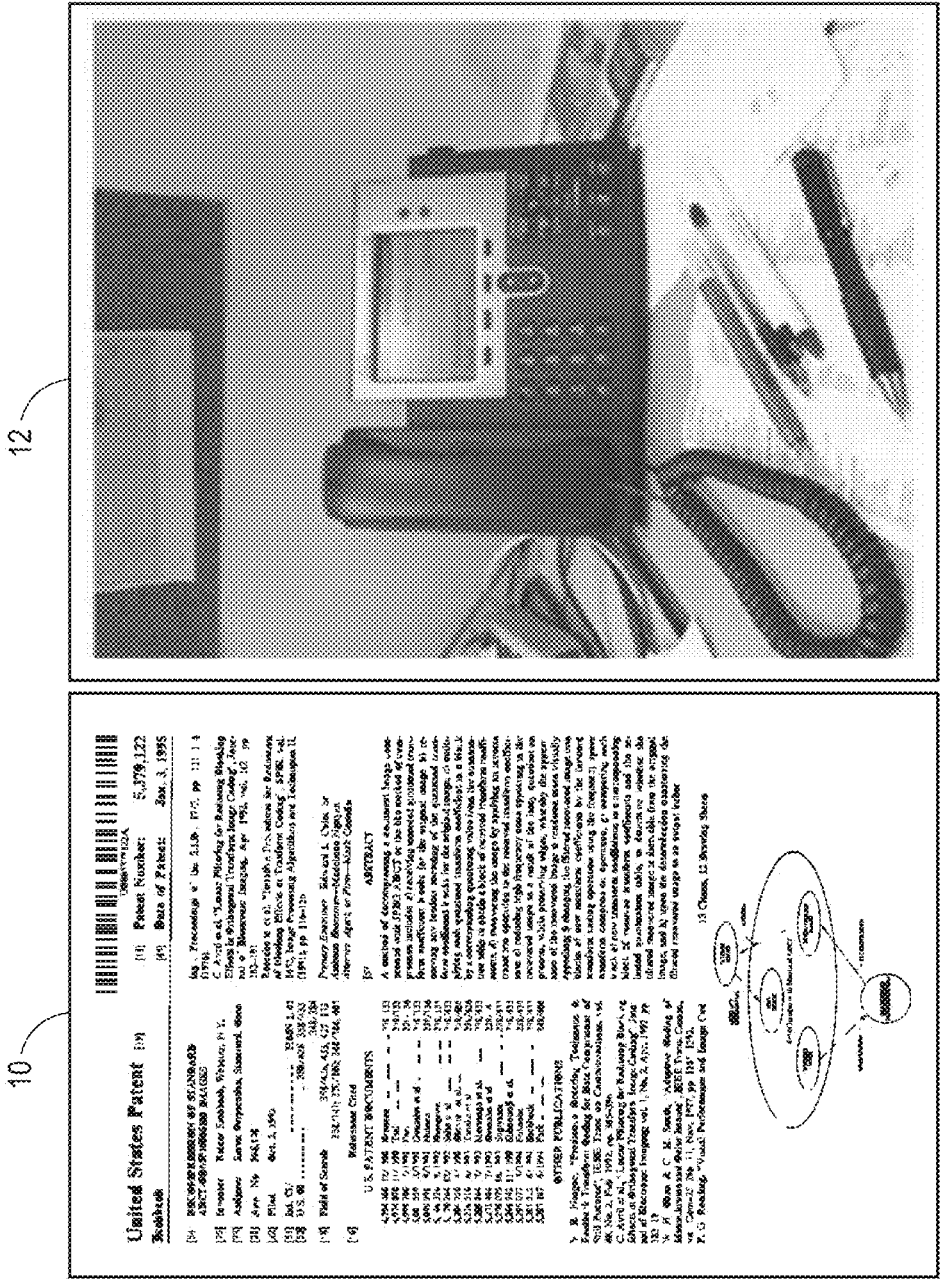
FIG. 1 illustrates two examples of printed documents, one of which primarily contains text and graphics, and the other of which primarily contains an image.

This disclosure is not limited to the particular systems, devices and methods described, as these may vary. The terminology used in the description is for the purpose of describing the particular versions or embodiments only, and is not intended to limit the scope.

As used in this document, the singular forms of any word, and defining adjectives such as "a," "an" and "the," each include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

A "computing device" or "electronic device" is a device that includes a processor and non-transitory computer-readable memory. The memory contains programming instructions in the form of a software application that, when executed by the processor, causes the device to perform various operations according to the programming instructions. Examples of electronic devices include computers, servers, smartphones, personal digital assistants, cameras, tablet devices, electronic readers, personal computers, media players, satellite navigation devices and the like.

The terms "memory" and "computer-readable medium" each refer to a non-transitory device on which computer-readable data, programming instructions or both are stored. Unless the context specifically states that a single device is required or that multiple devices are required, the terms "memory" and "computer-readable medium" include both the singular and plural embodiments, as well as portions of such devices such as memory sectors.

A "print device" is an electronic device that is capable of receiving commands and/or data, and in response printing characters and/or images on a substrate. Printing devices may include, but are not limited to, network printers, production printers, copiers and other devices using ink or toner, and scanners. A print device may also perform a combination of functions such as printing and scanning, in which case such a device may be considered a multifunction device.

A "processor" is a component of an electronic device that executes programming instructions. The term "processor" may refer to either a single processor or to multiple processors that together implement various steps of a process. Unless the context specifically states that a single processor is required or that multiple processors are required, the term "processor" includes both the singular and plural embodiments.

Watermarks are security markings that are printed on a document and that can provide for the authentication or tracking of the documents on which they are printed. For example, American currency carries a watermark that can be observed under the correct viewing conditions. In particular, if one holds a current $5 or greater American bill up to a light, a watermark bearing the image of the person whose portrait is on the bill will be revealed. The watermark helps prevent counterfeiting because it represents a technological hurdle for counterfeiters. As such, the watermark helps authenticate the currency. A "secure document," or "secure copy" is a printed document that contains a watermark or other security marking on it.

This document describes a method and system that can help people clearly identify a copy of an original document. A watermark can help one confirm whether or not a document is an original. Visible watermarks also can have the effect of deterring people against negligence and in raising awareness of the sensitive nature of a document. In the embodiments discussed below, it is desired that the system apply the watermark to the document on creation, and also that the mark portrays an appropriate message to deter negligence and help prevent ignorance. Thus, the system creates a copy of a document using a minimally-destructive watermark that adapts to the content of the document.

FIG. 1 shows two documents will be used as examples for the purpose of this discussion. The first document 10 represents an example of a document that primarily or purely includes text (i.e., alphanumeric characters) and graphics. The second document 12 represents an example of a document that primarily or purely includes an image (i.e., photos, drawings, and the like). Many documents that exist will fall somewhere in between these two extremes, with a combination of images with text and/or graphics.

Figure 2:
FIG. 2 illustrates an example of a non-invasive watermark.

FIG. 2 illustrates an example of a watermark 20 that may be applied to a document. In FIG. 2, the watermark 20 has been enhanced with dotted lines solely for purpose of easier viewing in this patent document. In practice, however, a watermark may simply consist of shaded substrate portions, with no outlines. If watermark 20 were applied to text-based document 10 of FIG. 1, the watermark would be visible and useful because document 10 is primarily text and contains significant white space between its printed content elements. On the other hand, if watermark 20 were applied to the image-based document 12 of FIG. 1, the watermark would not be useful, as the darker areas of the image in document 12 would overshadow the watermark, and only small portions of the watermark (i.e., likely the portions located in areas of the image that are white space) would be visible.

Figure 3:
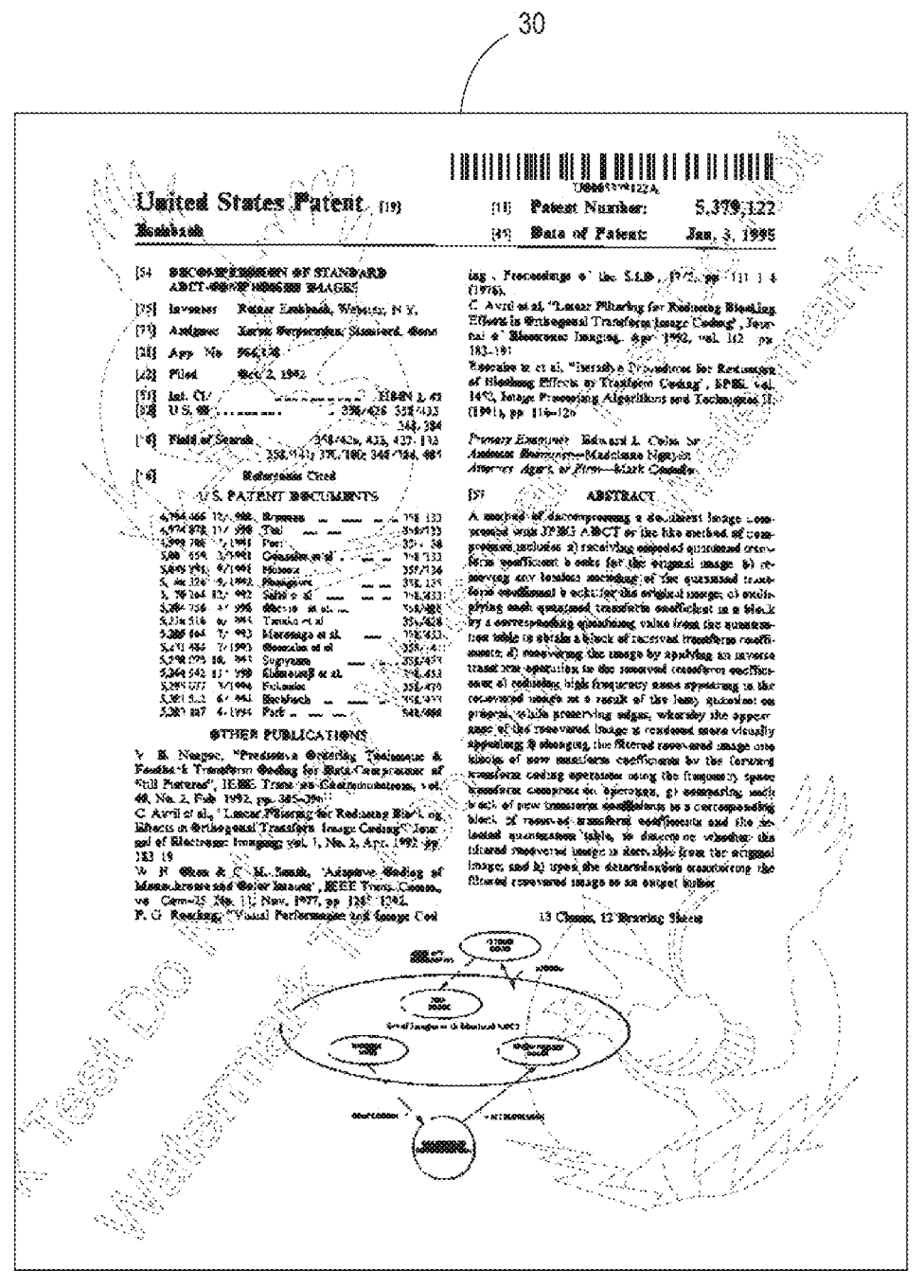
Figure 4:
FIG. 4 illustrates an example of the image-based document of FIG. 1 with an invasive watermark applied to it.

To address this issue, the systems described in this document dynamically apply a watermark to a document in a way that helps ensure that the watermark will be visible, no matter what other printed content is on the document. To do this, this document makes a distinction between printing a watermark in an "invasive" manner versus printing a watermark in a "non-invasive" manner. In general, a "non-invasive" watermark is a watermark or portion of a watermark that does not cover (i.e., interfere with or obscure) the other printed content that appears on the document. For example, text-based document 10 of FIG. 1 includes a substantial amount of white space, so watermark 20 (of FIG. 2) can be applied to document 10 in a non-invasive way such that the watermark 20 remains visible and does not interfere with the document's original content. (See watermarked document 30 in FIG. 3.) On the other hand, an "invasive" water mark is one that covers at least a portion of the document's original content. The term "cover" does not necessarily mean that the watermark is physically printed over the existing content, but instead means that the watermark will be brought to the forefront, and the original content sent to the background, so that the watermark obscures a portion of the original image. In print terms this may be considered similar to "embossing" a portion of the image with the watermark. FIG. 4 illustrates an example watermarked document 40, in which a modified (invasive) portion of watermark 20 has been applied to image-based document 12.

Figure 5:
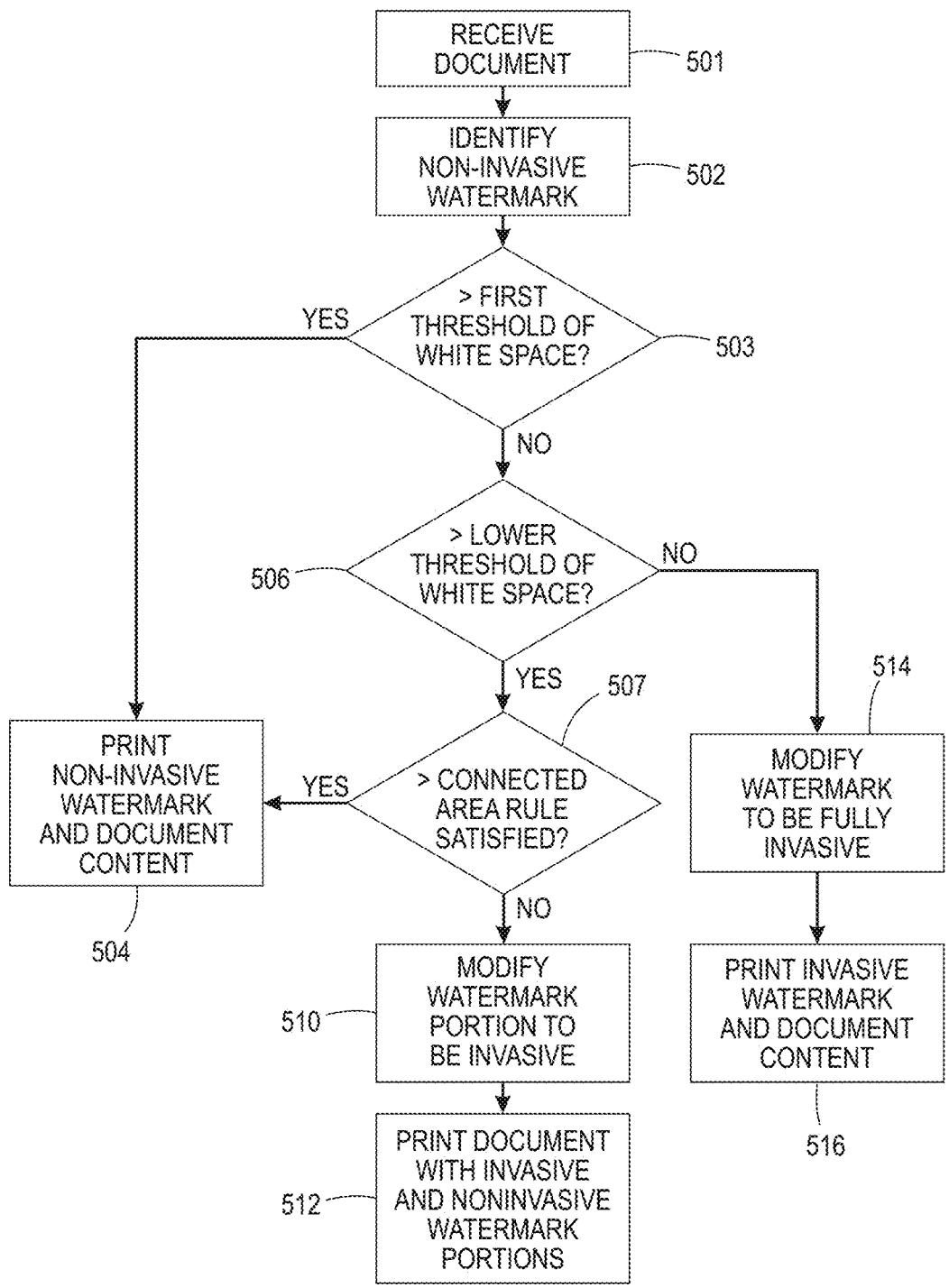
FIG. 5 is a flowchart illustrating a process of applying a watermark to a document and printing the document with the watermark.

FIG. 5 is a flowchart illustrating example steps of a process of applying a content-variable watermark to a document. The process may be implemented by a system that includes a computing device having a processor that implements programming instructions, a print device having a processor and input interface, or by a combination of such devices. The system will receive an electronic representation of a document to be printed onto a substrate 501. The document may include any combination of text, numbers, other characters, graphics, images and/or other content to be printed. The system may receive the electronic representation of the document as a data file, by scanning an already-printed document, or by other means. Alternatively, the system may create the original document based on user input via an input interface of the computing device or print device.

The system may identify a non-invasive watermark to be printed on the substrate with the document's content 502. The system may perform this selection according to any suitable rule set. For example, the system's memory may store a library of data files corresponding to parameters and/or instructions for watermarks. When a user enters a command into the input interface of the print device or the computing device to create a watermarked copy, the system may select a non-invasive watermark from the library. The selection may be done randomly, or based on rules such as those which require a particular type of, category of, or particular watermark to be applied to a document that meets certain size, content or other criteria. Alternatively, the system may include an output interface such as a display via which the system may show the user various available watermarks and receive a selection of one of the available watermarks from the user. Optionally, the system may implement programming instructions by which the user may use the user interface to enter one or more customizations to the watermark. For example, the watermark 20 of FIG. 2 includes certain text, along with graphics that include birds. The user interface may permit the user to select or alter the text used, and/or to select an available graphic to be printed with the watermark.

Returning to FIG. 5, the system will analyze the document and the selected non-invasive watermark to determine whether at least a first threshold amount of the non-invasive watermark can be printed in a white space of the document 503. For the purpose of this disclosure, the term "white space" refers to any area of the document that is either solid white or of another solid color that is light enough so that when a portion of the non-invasive watermark is printed on the document in that area, that portion of the watermark will be visible to the unaided human eye. Typically, although not necessarily required, the white space will not contain any text, graphics or image. If at least the threshold amount of the watermark can be printed in the white space, then a print device of the system may print the complete watermark and the document content on the substrate 504 so that the watermark and document content are both visible on the resulting document. On the other hand, if at least the first threshold amount of the watermark cannot be printed in the white space, then the system may modify at least a portion of the non-invasive watermark to be invasive 510 using processes such as those that will be described in more detail below.

The system may also consider a second threshold amount that is lower than the first threshold. If the system cannot print at least the second threshold amount of the watermark in the white space 506, then the system may modify the entire watermark so that it is invasive 514, and it will print the resulting invasive watermark and document content on the substrate 516.

Figure 6:
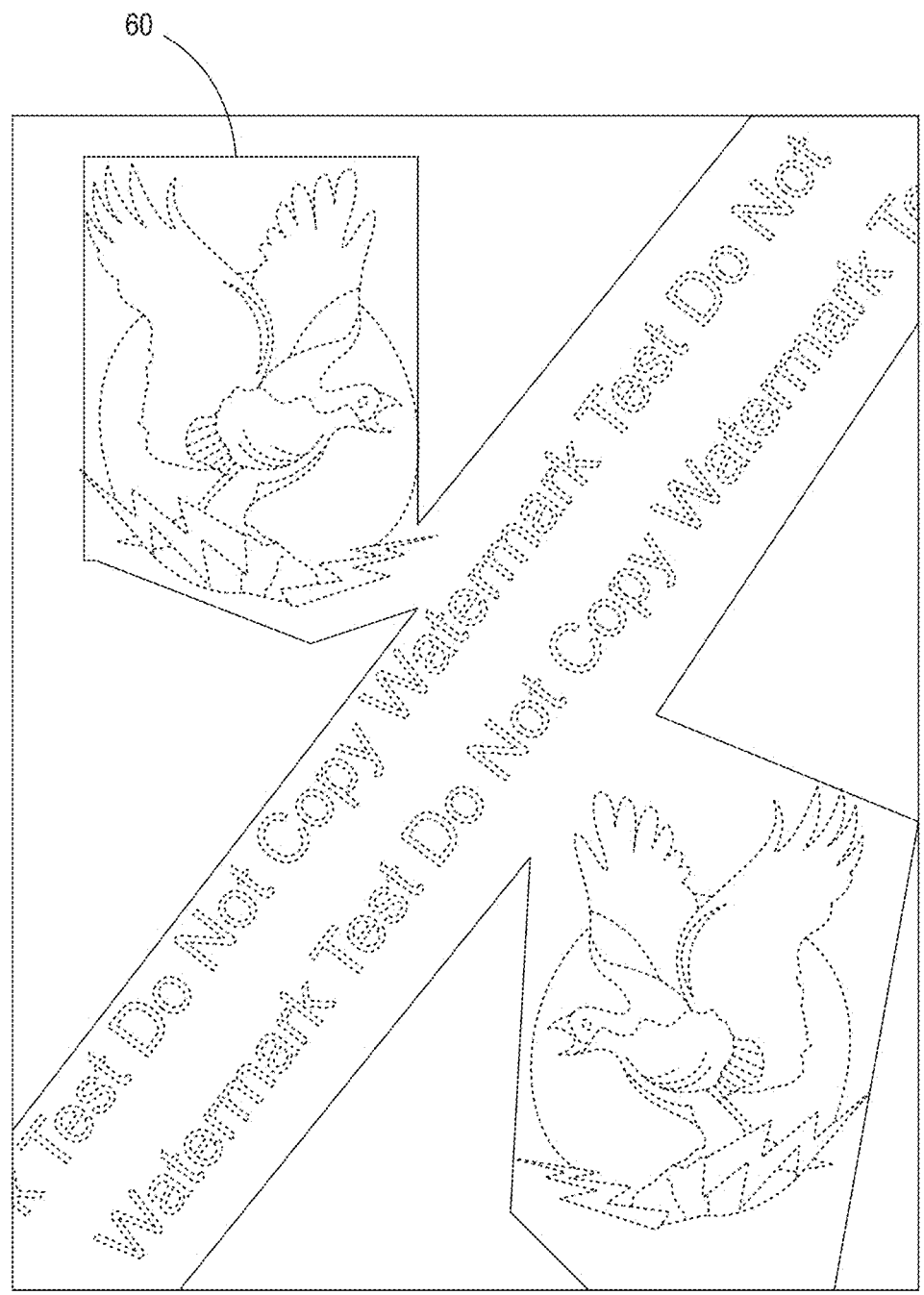
FIG. 6 illustrates a boundary area of a watermark.

To determine whether at least a first threshold amount of the non-invasive watermark can be printed in a white space of the document 503, as well as to determine whether the system can print at least the second threshold amount of the non-invasive watermark in the white space 506, the system may determine a portion of the document that will correspond to a background area with no printed content, and calculate what percentage of the document will make up the background area. The system may then compare this result to any suitable thresholds. For example each threshold may refer to a percentage or relative amount of the overall image. Or, the thresholds may refer to a percentage or relative amount of the portion of the image that will be present within a boundary of the watermark. As a visual example, FIG. 6 shows an example of a bounded area 60 for a watermark, and with the second option the threshold may refer to a portion of the content that will be present on the document within the bounded area 60. Any suitable thresholds may be used. For example, the first threshold may be 90%, 80%, 75%, 70%, 67%, 66%, 60%, 55%, 51% or any other number between or outside of such thresholds. The second threshold may be 10%, 20%, 25%, 30%, 33%, 34%, 40%, 45%, 49% or any other number between or outside of such thresholds.

Figure 7:
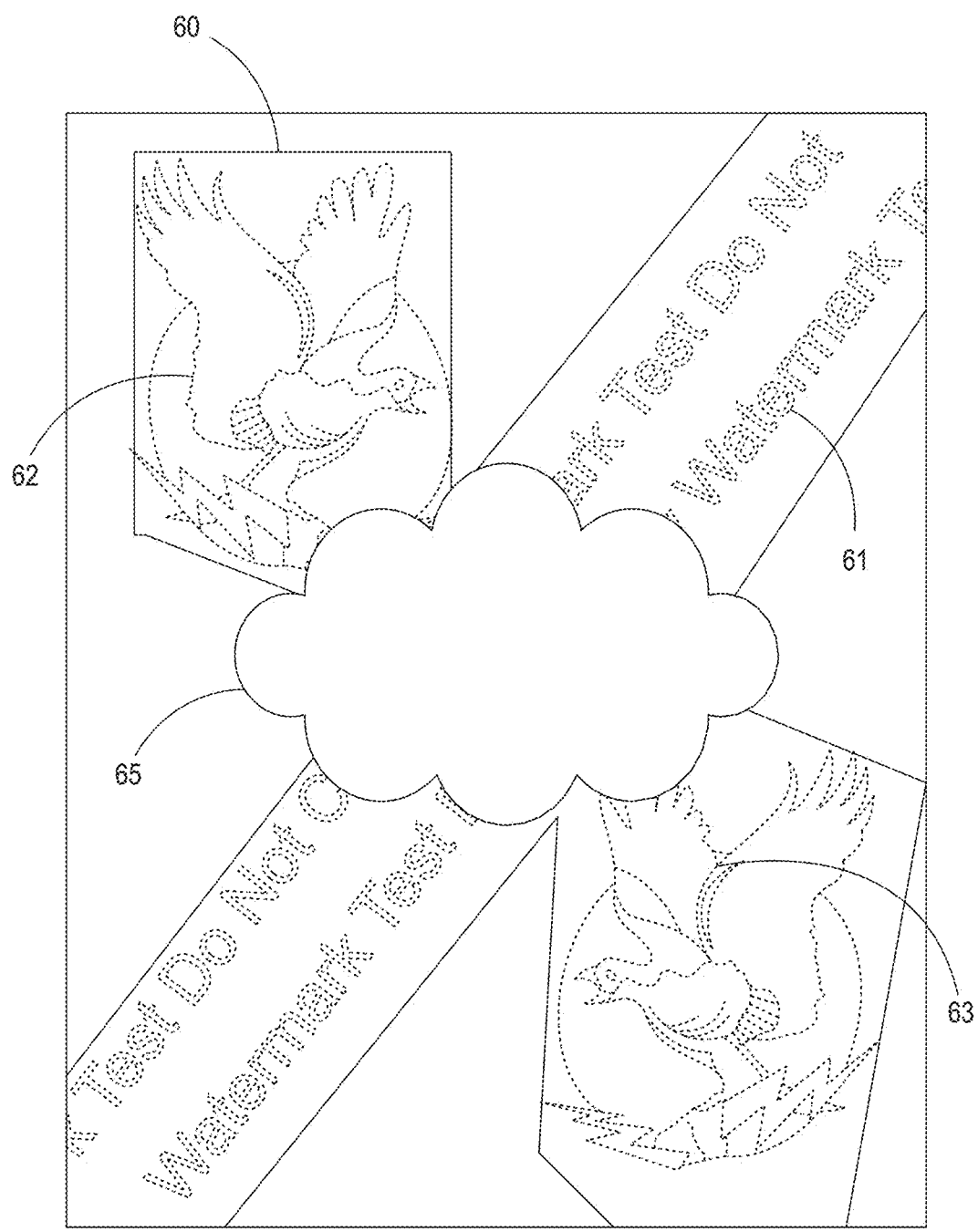
FIG. 7 illustrates how an image or other document content may break a watermark into multiple sub-areas.

Optionally, alternatively or in addition to considering either the upper or the lower threshold, the system may apply one or more rules that consider whether at least a threshold portion of the non-invasive watermark will be printed on areas of white space that are contiguous (i.e., connected) 507 so that the watermark is not significantly broken up. The system may determine this using any suitable process. For example, the system may determine a boundary of the watermark (such as boundary 60 in FIG. 6) and determine whether the non-white space areas cross two boundary lines so that the area within the original boundary is broken up into at least a threshold number of distinct sub-areas. An example of this is shown in FIG. 7, in which the area formed by boundary has been broken into three sub-areas 61-63 because of the presence of non-white space 65 in an area that coincides with the location of the watermark.

Returning to FIG. 5, to convert the non-invasive watermark (or portion) to be invasive 510/514, the system may change the color or shading that will be applied to the pixels or particular portions to be converted. For example, a non-invasive portion of a watermark may be a light shade of gray or tan so that it does not significantly contrast with the color of the area on which it are printed. Invasive portions may have a color that significantly contrasts with the color of the area on which they are printed, such as white (for areas of the document in which the content will be of a dark color) or black (for areas of the document in which the content will be of a light color).

If, after any of the processes described above, the system determines that only a portion of the watermark needs to be modified to be invasive, the system will print the non-invasive portion of the watermark to cover a portion of the document's white space, and it will print the modified, invasive portion of the watermark to cover a portion of the document's other areas (i.e., non-white space) 512.

Figure 8:
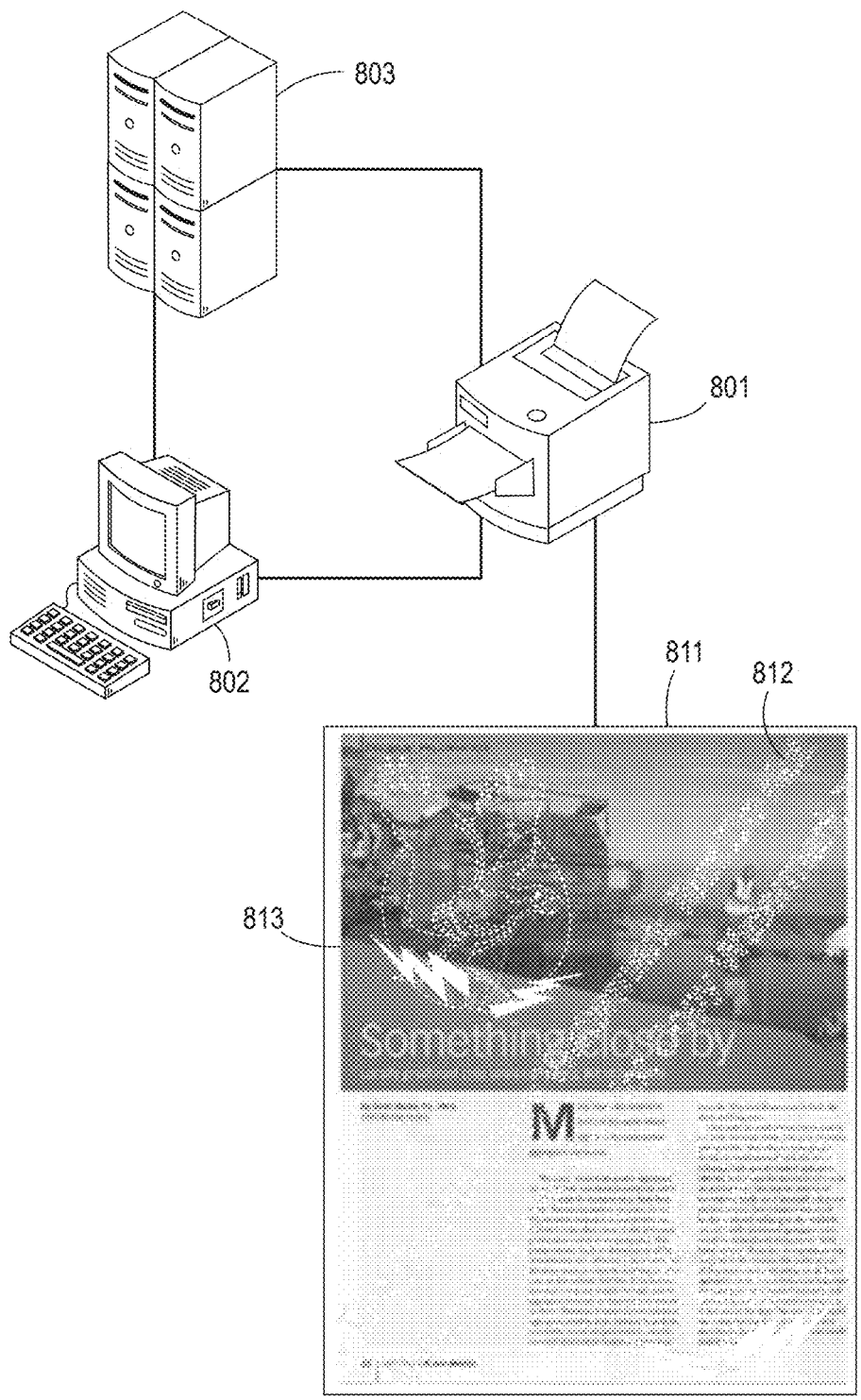
FIG. 8 illustrates elements of a system that may be used to create a document with content and a watermark.

FIG. 8 illustrates the basic elements of a system that may be used to create and/or print an document with a watermark such as that described above. The system includes a print device 801 that includes supply chambers for ink or toner and a print head that can apply the ink or toner to a substrate to create a marking. The print device 801 may include a processor and memory with programming instructions that cause the printer to receive data from an external source and process the data perform various print-related functions. (Such instructions may be known to those of skill in the art as a "digital front end".) In addition or alternatively, the print device 801 may be in wired or wireless electronic communication with one or more computing devices 802 that include a processor and computer-readable medium with an installed print driver that provides instructions, data or both to the printer. In addition or alternatively, the print device 801 and/or printer may be in wired or wireless electronic communication with one or more remote servers 803 that include a processor and computer-readable medium that is configured to send instructions, data or both to the printer or the computing device.

In operation, the printer 801 will print a document 811 that contains characters, graphics, images or other non-secure content 813 that will be visible to an ordinary viewer, along with a watermark 812 containing one or more invasive portions created in accordance with the methods described below. The watermark 812 shown in FIG. 8 is merely an example, and it may be any mark that exhibits the components described above.

Figure 9:
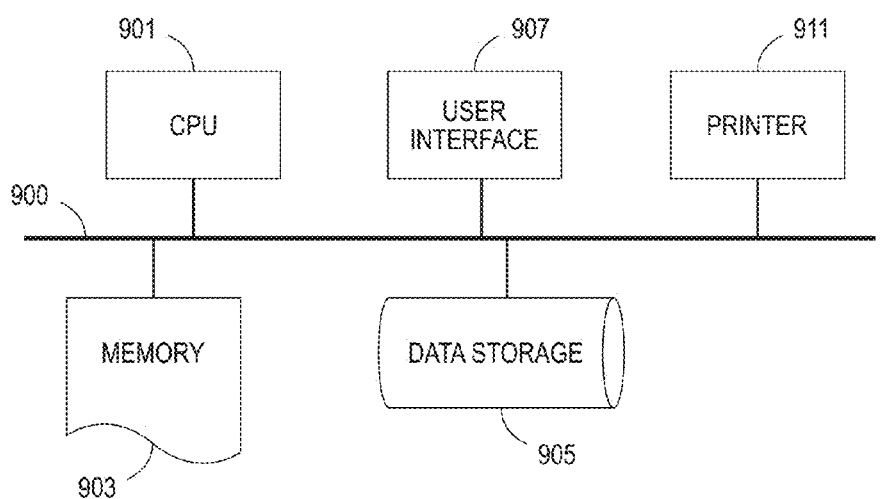
FIG. 9 is a block diagram showing various equipment that may be used to implement various embodiments of the processes described in this document.

FIG. 9 depicts a block diagram of hardware and/or electronics that may make up a system that modifies the mark elements, develops instructions for printing a security mark, and prints the security mark. One or more communications lines 900 such as a bus (for a single device) or network (for multiple devices) may interconnect the illustrated components and allow data and/or signals to flow between the components. CPU 901 represents one or more processors that will perform calculations and logic operations required to execute a program. Any number of processors may be available, and they may be part of a single electronic device or distributed across any number of networked electronic devices. When this document and its claims uses the term "processor," unless specifically stated otherwise it is intended to refer to all such embodiments (i.e., single processor or multiple processors). The processor(s) may access a computer-readable memory device 903 containing programming instructions, along with a data storage facility 905 such as a database that stores the package generation templates and/or rule sets.

A user interface 907 is a device or system that provides output to, and receives input from, a user. The user interface may include a display, audio output, a printer, or another element that provides information to a user. The user interface 907 also may include a touch-sensitive component, microphone, audio port, keyboard, mouse, touch pad, or other input mechanism that is capable of receiving user input. The user interface 907 may be part of a print device, such as a keypad and/or touch-sensitive display. Accordingly, the system also may include one or more printing devices 911, each of which contains hardware that enables it to print marks on a substrate. The printing device(s) may, individually or collectively, contain toner reservoirs with toner. As used in this document, the term "reservoir" means any structure that holds toner, which may be in liquid, solid, gel, or other form.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of creating a copy of a document, comprising:
 receiving an electronic representation of a document to be printed onto a substrate;
 identifying a non-invasive watermark to be printed on the substrate;
 analyzing the document and the non-invasive watermark to determine whether a first threshold amount of the non-invasive watermark can be printed in a white space of the document by:
  determining a portion of the document that corresponds to a boundary area of the non-invasive watermark, and
  determining whether one or more non-white space areas of the document will divide the boundary area into at least a threshold number of sub-areas;
 determining that the amount of the non-invasive watermark that can be printed in the white space is less than the first threshold;
 in response to determining that the amount of the non-invasive watermark that can be printed in the white space is less than the first threshold, modifying at least a portion of the non-invasive watermark to comprise an invasive watermark portion that, when printed, will cover a portion of the document content that is outside of the white space of the document; and
 creating a secure copy of the document by:
  printing document content for the document on the substrate, and
  printing the invasive watermark portion so that the invasive watermark portion covers the portion of the document content that is outside of the white space of the document.

2. The method of claim 1, further comprising printing an unmodified portion of the non-invasive watermark in the white space of the document.

3. The method of claim 1, further comprising:
 determining that at least a second threshold amount of the non-invasive watermark cannot be printed in the white space of the document, and in response performing the modifying so that the non-invasive watermark is fully converted into an invasive watermark.

4. The method of claim 1, wherein modifying at least a portion of the non-invasive watermark to comprise an invasive watermark portion comprises converting a color of the modified portion of the non-invasive portion to a color that will significantly contrast with the portion of the document that the non-invasive portion will cover.

5. The method of claim 1, wherein analyzing the document and the non-invasive watermark to determine whether at least a first threshold amount of the non-invasive watermark can be printed in a white space of the document comprises:
 determining a portion of the document that will correspond to a background area that will have no printed document content; and
 calculating a percentage of the document that will comprise the background area, and determining whether the percentage at least exceeds the threshold.

6. The method of claim 1, wherein analyzing the document and the non-invasive watermark to determine whether at least a first threshold amount of the non-invasive watermark can be printed in a white space of the document comprises:
 determining a portion of the document that corresponds to a boundary area of the non-invasive watermark;
 identifying a background area within the boundary area that will have no printed document content; and
 calculating a percentage of the document within the boundary area that will comprise the background area, and determining whether the percentage at least exceeds the threshold.

7. The method of claim 1, further comprising:
 receiving, via the user interface, a user command to customize an element of the non-invasive watermark; and in response to the user command, applying a modification to the element of the non-invasive watermark.

8. The method of claim 1, wherein receiving the electronic representation of the document comprises receiving the electronic representation as a data file from an external source.

9. A secure document creation system, comprising:
a print device;
a user interface;
a processor; and
a non-transitory computer-readable medium containing programming instructions that are configured to cause the processor to:
   receive an electronic representation of a document to be printed onto a substrate,
   identify a non-invasive watermark to be printed on the substrate,
   analyze the document and the non-invasive watermark to determine whether a first threshold amount of the non-invasive watermark can be printed in a white space of the document by:
      determining a portion of the document that corresponds to a boundary area of the non-invasive watermark, and
      determining whether one or more non-white space areas of the document will divide the boundary area into at least a threshold number of sub-areas,
   determine that the amount of the non-invasive watermark that can be printed in the white space is less than the first threshold,
   in response to determining that the amount of the non-invasive watermark that can be printed in the white space is less than the first threshold, modify at least a portion of the non-invasive watermark to comprise an invasive watermark portion that, when printed, will cover a portion of the document content that is outside of the white space of the document, and
   cause the print device to create a secure copy of the document by printing document content of the document on the substrate with the invasive watermark portion so that the invasive watermark portion covers the portion of the document content that is outside of the white space.

10. The system of claim 9, wherein the user interface is an element of the print device.

11. The system of claim 9, further comprising additional programming instructions that are configured to cause the print device to print an unmodified portion of the non-invasive watermark in the white space of the document.

12. The system of claim 9, further comprising additional programming instructions that are configured to cause the processor to:
   determine that at least a second threshold amount of the non-invasive watermark cannot be printed in the white space of the document, and in response perform the modifying so that the non-invasive watermark is fully converted into an invasive watermark.

13. The system of claim 9, wherein the instructions for modifying at least a portion of the non-invasive watermark to comprise an invasive watermark portion comprise instructions to convert a color of the modified portion of the non-invasive portion to a color that will significantly contrast with the portion of the document that the non-invasive portion will cover.

14. The system of claim 9, wherein the instructions for analyzing the document and the non-invasive watermark to determine whether at least a first threshold amount of the non-invasive watermark can be printed in a white space of the document comprise instructions to:
   determine a portion of the document that will correspond to a background area that will have no printed document content; and
   calculate a percentage of the document that will comprise the background area, and determine whether the percentage at least exceeds the threshold.

15. The system of claim 9, wherein the instructions to analyze the document and the non-invasive watermark to determine whether at least a first threshold amount of the non-invasive watermark can be printed in a white space of the document comprise instructions to:
   determine a portion of the document that corresponds to a boundary area of the non-invasive watermark;
   identify a background area within the boundary area that will have no printed document content; and
   calculate a percentage of the document within the boundary area that will comprise the background area, and determine whether the percentage at least exceeds the threshold.

16. The system of claim 9, further comprising additional programming instructions that are configured to cause the processor to:
   receive, via the user interface, a user command to customize an element of the non-invasive watermark, and
   in response to the user command, apply a modification to the element of the non-invasive watermark.

17. The system of claim 9, wherein:
the system further comprises a communication port; and
the instructions for receiving the electronic representation of the document comprise instructions to receive the electronic representation as a data file from an external source via the communication port.

18. A secure document creation system, comprising:
a print device;
a user interface;
a processor; and
a non-transitory computer-readable medium containing programming instructions that are configured to cause the processor to:
   receive an electronic representation of a document to be printed onto a substrate,
   identify a non-invasive watermark to be printed on the substrate,
   receive, via the user interface, a user command to customize an element of the non-invasive watermark, and in response to the user command apply a modification to the element of the non-invasive watermark,
   analyze the document and the non-invasive watermark to determine whether a first threshold amount of the non-invasive watermark can be printed in a white space of the document by:
      determining a portion of the document that corresponds to a boundary area of the non-invasive watermark, and
      determining whether one or more non-white space areas of the document will divide the boundary area into at least a threshold number of sub-areas,
   determine that the amount of the non-invasive watermark that can be printed in the white space is less than the first threshold,
   modify at least a portion of the non-invasive watermark to comprise an invasive watermark portion, and cause the print device to create a secure copy of the document by printing document content of the document on the substrate with the invasive watermark portion so that:
   the invasive watermark portion covers a portion of the document content that is outside of the white space, and
   an unmodified portion of the non-invasive watermark is printed in the white space.

* * * * *